United States Patent [19]

Rozycki

[11] 4,442,755

[45] Apr. 17, 1984

[54] POWER STAGE SERVO VALVE FOR A SEISMIC VIBRATOR

[75] Inventor: Marek L. Rozycki, Houston, Tex.

[73] Assignee: Litton Resources Systems, Inc., Alvin, Tex.

[21] Appl. No.: 342,274

[22] Filed: Jan. 25, 1982

[51] Int. Cl.³ ............................................ F15B 21/02
[52] U.S. Cl. ......................................... 91/39; 91/364; 137/625.21; 137/624.13
[58] Field of Search ................... 91/35, 39, 216 B; 137/625.21, 624.13, 624.15

[56] References Cited

U.S. PATENT DOCUMENTS

| | | | |
|---|---|---|---|
| 523,077 | 7/1894 | Loss | 137/625.21 |
| 1,141,218 | 6/1915 | Sparks | 91/39 |
| 3,552,891 | 1/1971 | Woodling | 137/625.21 |
| 3,696,710 | 10/1972 | Ortelli | 137/625.21 |
| 3,720,136 | 3/1973 | Uchida et al. | 91/35 |
| 3,745,885 | 7/1973 | Fair et al. | 91/216 B |
| 3,941,154 | 3/1976 | Bishop | 137/624.13 |
| 4,308,924 | 1/1982 | Boguth | 91/39 |

*Primary Examiner*—Robert E. Garrett
*Assistant Examiner*—H. Li
*Attorney, Agent, or Firm*—William A. Knox

[57] ABSTRACT

A power stage servo valve for a seismic vibrator includes a stationary orifice plate defining a plurality of valve ports having a first shape. A rotary orifice plate, abutting the stationary orifice plate, defines a like plurality of valve ports that have a shape different from the valve ports in the stationary orifice plate. The configuration and shape of the rotary valve ports is such that the valve opens more quickly than it shuts off when the plate is rotating continuously in one direction at a desired angular velocity.

3 Claims, 7 Drawing Figures

POWER STAGE SERVO VALVE FOR A SEISMIC VIBRATOR

BACKGROUND OF THE INVENTION

1. Field of the Invention

This invention is concerned with a rotary servo valve for improving the high-frequency power output and for shaping the output signal of a seismic vibrator.

2. Description of the Prior Art

There are many types of seismic vibrator systems available for use in shaking the earth for geophysical exploration. Typically a seismic vibrator consists essentially of a large base plate for contacting the earth. A hydraulic linear actuator reciprocates the base plate relative to a reaction mass at selected frequencies to inject a desired vibratory wave train into the earth. A typical vibrator is shown, for example, in U.S. Pat. No. 3,745,885.

The linear actuator usually consists of a double-faced drive piston mounted concentrically on a shaft. The lower end of the shaft is connected to the base plate. The shaft and drive piston are enclosed within a double-acting hydraulic cylinder formed within the reaction mass. Hydraulic fluid under pressure is applied alternately, through suitable plumbing, to the hydraulic cylinder on opposite sides of the drive piston to reciprocate the linear actuator. The entire assembly is usually carried by a suitable vehicle. During transport from place to place the vibrator assembly is lifted clear of the ground. In operation, the base plate is pressed against the ground by the static weight of the carrier vehicle which is generally applied through isolator springs such as air bags.

The hydraulic system used to drive the linear actuator consists first of an electrohydraulic pilot valve. The pilot valve is electrically driven by a suitably-programmed pilot signal such as a chirp signal whose frequency varies monotonically with time. A typical chirp signal might include a three-octave spectrum from 10 to 80 Hertz (Hz) over a period of, perhaps, 16 seconds. Special chirp signals extending an additional octave to 160 Hz may be used to increase system resolution.

The hydraulic output of the pilot valve drives a hydraulic power stage servo valve which in turn, drives the hydraulic linear actuator. An accelerometer mounted on the base plate monitors the motion of the baseplate. Through a feedback loop, the accelerometer output signal is used to adjust the input signal to the pilot valve so that the signal actually injected into the earth remains in proper phase relationship with the reference signal. Examples of known hydraulic circuits may be found in any one of a large number of vibrator patents such as U.S. Pat. No. 3,881,167 or in U.S. patent application No. 255,205 filed Mar. 17, 1981 and assigned to a related firm of the assignee of this invention.

In all of the known seismic vibrators, the pilot and power stage valves are conventional, linear, spool-type servo valves. In the power stage servo, the spool reciprocates back and forth to open first one valve port and then the other so that hydraulic fluid flows first to one side and then to the other side of the double-faced drive piston.

The spool of the power stage servo has substantial inertia. At the higher frequencies of the chirp signal or sweep, the inertia of the spool tends to constrain the spool from fully opening its valve ports during each stroke of the spool. The result is a substantial loss of power, due to the restricted fluid flow to the linear actuator, at sweep frequencies above about 100 Hz. The base plate amplitude loss at high frequencies relative to the lower frequencies may become as large as 24 dB per octave or more.

Another problem associated with known vibrator systems, particularly at lower sweep frequencies, involves hydraulic-fluid pressure surges. As mentioned before, at low frequencies hydraulic fluid is applied, at full pressure, alternately to each of the opposite sides of the drive piston of the linear actuator to reciprocate the base plate relative to the mass. As the actuator is completing its stroke in one direction full hydraulic power is still being applied to the powered side of the drive piston. As the stroke ends, the fluid flow is abruptly reversed to the opposite side of the piston for the return stroke. Due to inertia of the linear actuator the drive piston unavoidably collides momentarily with the suddenly locked oil column entrapped in the cylinder and then with reversed inflow of pressurized fluid, creating a severe hydraulic shock or "water hammer" effect.

The hydraulic shock generates unwanted spikes in the output signal and wreaks havoc with the hydraulic-line hoses and plumbing. The problem above outlined becomes more serious as the chirp signal frequency decreases because of the higher velocity of actuator motion relative to the reaction mass. To prevent physical system damage, the power output of the vibrator must be attenuated by the operator to a safe but undesired lower level.

Thus, because of system inertia, both high and low frequency response and available output power are limited when using known vibrator system designs that require use of a spool type power stage servo valve.

SUMMARY OF THE INVENTION

It is an object of this invention to improve the high frequency power output of a seismic vibrator and to eliminate or minimize the hydraulic shock that occurs when the direction of motion of the linear actuator is abruptly reversed at the end of each reciprocal stroke.

In accordance with this invention, I replace the linear-motion spool-type power-stage servo valve with a rotary servo valve. The rotary valve consists of a valve body having a pair of peripheral fluid flow ports. The peripheral ports are fluidly coupled to the hydraulic cylinder portion of the linear actuator, for applying hydraulic fluid to opposite sides of the drive piston. Valving action is provided by a rotary distributor that applies pressurized hydraulic fluid from an inlet port, through the peripheral ports, alternately to opposite sides of the drive piston in alternate cycles when the distributor is rotated continuously in one direction for a desired time period. Low-pressure fluid from the unpressurized side of the drive piston returns through an outlet port of the distributor. The linear actuator, reciprocating first in one direction and then in the other direction during each alternate drive cycle, drives the attached ground-contacting base plate to inject a train of pulses into the ground.

The distributor is configured so that the fluid flow rate during a drive cycle is programmed to render the rise time of the leading edge of each pulse of the train significantly shorter than the decay time of the trailing edge.

In accordance with an aspect of this invention, the valve body includes an orifice plate that defines first and second stationary orifices, which are in fluid communication with first and second peripheral ports. The distributor includes a rotary orifice plate that defines a pair of rotary orifices that are in fluid communication with the inlet and outlet ports respectively. Continuous rotation of the distributor in one direction aligns the rotary ports alternately with the first and second stationary ports and then with the second and first stationary ports. Thereby establishing alternate fluid flow paths to opposite sides of the drive piston in alternate cycles.

The geometric outlines of the rotary ports are different from the geometric outlines of the stationary ports to vary the fluid flow rate according to a desired function of angular rotor position.

DETAILED DESCRIPTION OF THE PREFERRED EMBODIMENT

Figure 1:
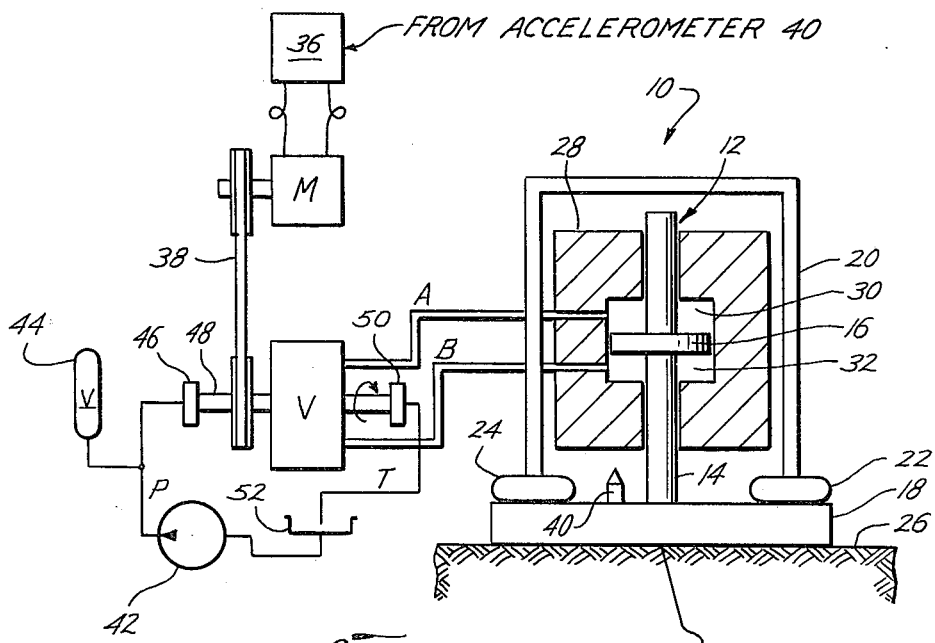
FIG. 1 is a simplified schematic drawing of a preferred vibrator system.

FIG. 1 is a skeletonized illustration of a vibrator 10 that employs the rotary valve of this invention. The essential parts and their functions are as follows: A linear actuator 12 consists of a shaft 14 and a concentrically-mounted double-faced drive piston 16. Shaft 14 is secured to a ground-contacting base plate 18. A framework 20 is attached to base plate 18 through air bags 22 and 24. Framework 20 may be supported and carried by a truck or an off-road tracked vehicle (not shown) of any well-known type. In use, the weight of the carrier vehicle, transmitted through the air bags 22 and 24, firmly couples base plate 18 to the ground surface 26.

A reaction mass 28 includes a hydraulic cylinder portion and encloses the drive piston 16 and a portion of shaft of 14 of linear actuator 12. The hydraulic cylinder formed inside reaction mass 28, is divided into upper and lower chambers 30 and 32 by piston 16 mounted on shaft 14 of the linear actuator. High pressure hydraulic conduits A and B conduct hydraulic fluid under high pressure into upper and lower chambers 30 and 32.

In operation, the linear actuator is reciprocated relative to the reaction mass by introducing hydraulic fluid under pressure from a power-stage servo valve V into the hydraulic cylinder alternately to opposite sides of drive piston 16 in upper and lower chambers 30 and 32 in alternate drive cycles, through lines A and B. Reciprocal motion of linear actuator 12 causes baseplate 18 to inject a desired chirp signal 34 into ground 26.

The preferred power stage servo valve of this invention is of a rotary type to be described in detail later. For the moment, it is sufficient to say that the rotary valve V is turned by variable-speed motor M whose speed is controlled by speed control programmer 36. Motor M may be of either a DC continuously rotating type or it may be a stepping motor capable of rotating stepwise continuously in one direction at a desired angular velocity under control of a pilot signal consisting of a train of digital pulses having a desired repetition rate. The motor speed of course sets the frequency of chirp signal 34. Valve V may be driven by a non-slip belt 38 as shown or by a gear train or by any other convenient means including means for starting and stopping the valve to generate a sweep. An accelerometer 40, mounted on base plate 18 monitors the output signal and sends phase-error correction terms back to speed-control programmer 36 through a feedback loop.

High-pressure hydraulic fluid is applied to valve V from pump 42 through line P and accumulator 44, through a rotating seal 46 into a fluid inlet passageway in shaft 48 and thence, alternately to peripheral ports A or B in a manner to be explained later. Low pressure fluid from peripheral ports B or A returns through a second fluid outlet passageway in shaft 48, through a rotary seal 50, thence through line T to drain 52. Rotary seals 46 and 50 may be of any well-known type such as a Chicksan swivel.

As described earlier, a conventional reciprocating spool valve suffers from inertial lag at high frequencies thereby reducing power output. Secondly, because the same spool control edge both opens and closes a fluid inlet or outlet port, a graph of fluid flow as a function of spool position is a symmetrical curve. That is for a symmetrical drive signal, the rise time from zero fluid flow, when the valve is closed, to full flow, when the valve is open, is the same as the decay time from full flow to fluid cutoff when the valve is again closed. Because the preferred rotary power-stage servo valve rotates in one direction continuously, inertial lag does not exist. By appropriate shaping of the outlines of the rotary valve ports, the decay time of the fluid-flow vs time function can be lengthened relative to the rise time. By that means, hydraulic shock at low freqencies may be minimized or eliminated. The rotary valve will now be explained in detail.

Figure 2:
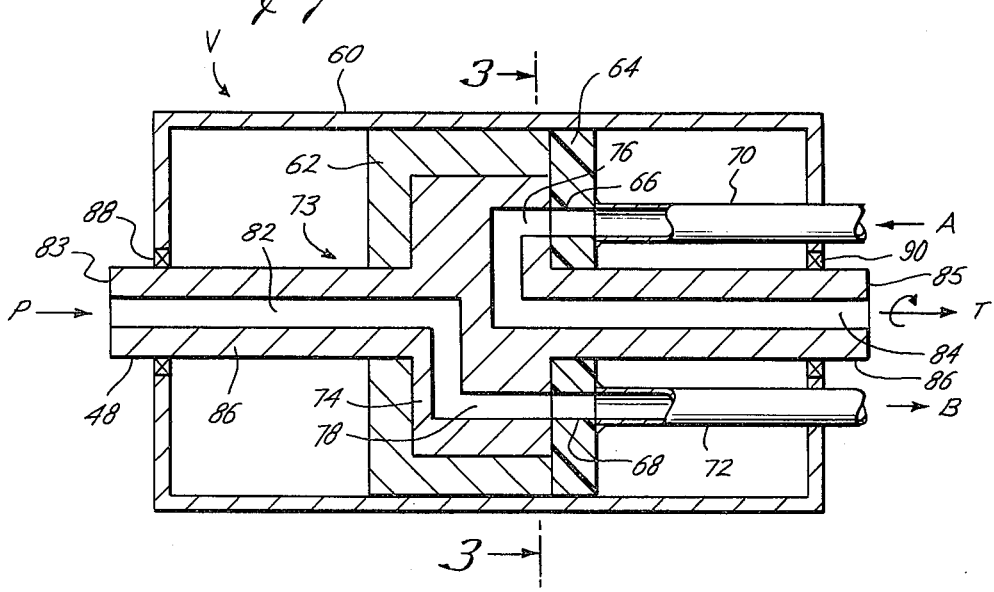
FIG. 2 is a sectional view of a rotary power stage servo valve.
Figure 3D:
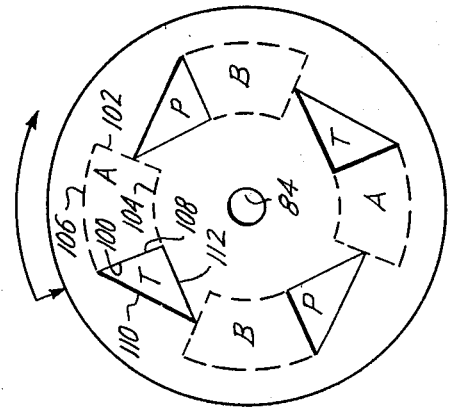
FIGS. 3a-3d show the relationship between rotary and stationary orifices at various angular positions of the rotary orifice plate.
Figure 3C:
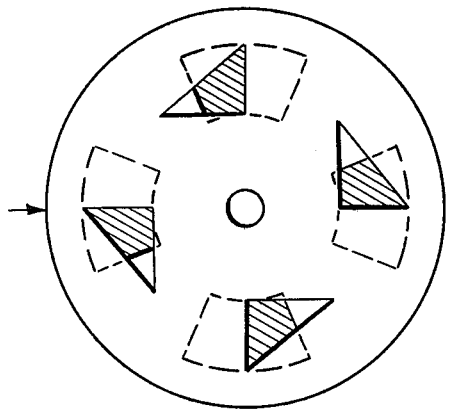
Figure 3B:
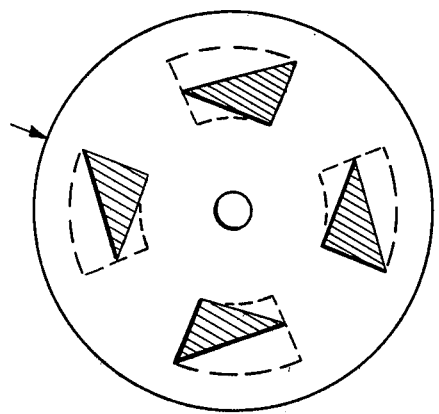
Figure 3A:
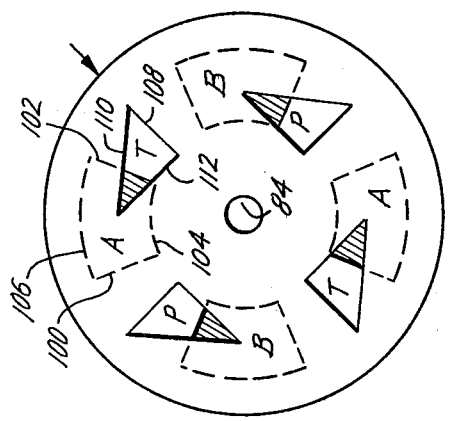

The rotary valve of this invention is shown in longitudinal cross section in FIG. 2. The valve consists of an outer cylindrical valve body or housing 60. A stator 62, having a stationary orifice plate 64, that is preferably circular is secured internally of housing 60. Orifice plate 64 may have a plurality of orifices or valve ports of which only two diametrically opposite orifices 66 and 68 are shown in FIG. 2 for simplicity. Orifices 66 and 68 are connected to peripheral ports A and B by suitable high pressure conduits 70 and 72.

A distributor 73 is mounted for rotation interiorly of valve body 60 and stator 62. It is contemplated of course, that stator 62 will be manufactured in two halves so that distributor 73 can be mounted within the stator during assembly. Distributor 73 consists of a shaft 86 and a rotary orifice plate 74, having a plurality of orifices or rotatable valve ports of which two, 76 and 78, are shown. Two noncommunicating longitudinal passageways 82 and 84 are disposed inside shaft 86. Passageways 82 and 84 extend inwardly from the ends 83 and 85 of shaft 86. The passageway openings P and T at the ends 83 and 85 form the hydraulic fluid inlet port and outlet port respectively. Shaft 86 is supported by suitable bearings 88 and 90.

Rotary orifice plate 74 defines at least two rotary orifices 76 and 78. Orifice 78 is in fluid communication with inlet port P via passageway 82 and orifice 76 is in fluid communication with outlet port T via passageway 84. The rotary orifice plate abuts the stationary orifice plate so that when the rotary orifices are aligned with either of the stationary orifices, a flow of hydraulic fluid can be established through the orifices. Conventional high pressure oil seals, well known to the art, are not shown as they form per se, no part of this invention.

In operation, distributor 73 is turned continuously in one direction at a desired angular velocity. The direction of turning is perpendicular to the direction of fluid flow through the valve ports or orifices. Pressurized hydraulic fluid from inlet port P is therefore directed alternately through peripheral ports B and A to opposite sides of drive piston 16 (FIG. 1) to reciprocate linear actuator 12 and its attached base plate 18. Fluid from the unpressurized side of drive piston returns to drain 52 through orifice 76 and outlet port T.

Each time that rotary port 78 (the pressure port) rotates past one of the peripheral ports A or B, linear actuator 12 is caused to execute a stroke in one direction or the other. At each alternate downward stroke, base plate 18 injects a pulse into ground 26. The period between successive pulses of a train of pulses (reciprocal frequency), depends on the angular velocity of distributor 73. If the angular velocity remains constant throughout a desired unit time period, the frequency of the pulse train is constant. A swept-frequency pulse train or chirp signal is generated when controller 36 is programmed to continuously vary the speed of motor M and hence the angular velocity of distributor 73 over the specified time period.

In FIG. 2 only two single orifices per orifice plate where shown to avoid complicating the drawing. Preferably, two pairs of orifices may be provided in order to provide a somewhat greater flow volume of hydraulic fluid and balance hydrostatic forces. FIG. 3 represents a view such as might be seen in cross section through 3—3' of FIG. 2. In FIG. 3, the dashed lines represent the outlines of stationary orifices corresponding to 66 and 68 which are connected to peripheral ports A and B. It is to be understood that each pair of orifices marked A and B is connected in parallel. The solid lines represent the outlines of the rotary orifices such as 76 and 78 which are connected to inlet port P and outlet port T. Each pair of orifices marked P and T is also connected in parallel.

An important feature of this invention is that the geometric outlines or boundaries of the rotary orifices are not the same as the geometric outlines of the stationary orifices. In FIG. 3, the stationary orifices are shown as annular sectors by way of example but not by way of limitation, having lateral radial boundaries 100, 102. The inner and outer boundaries are concentric circular arcs 104, 106, FIG. 3a. The distance between arcs 104 and 106 is the orifice width.

The shapes or outlines of the rotary orifices are shown as triangular although other configurations are possible. The leading edges of the rotary orifices are formed by a full-width radial lateral boundary 108. The trailing boundaries 110, 112 may be curves having similar or different characterizations. In the case shown, the trailing boundaries are curves having infinite radii, i.e. straight lines.

FIGS. 3a–3d show the physical change in the effective fluid flow areas of the valve ports as the rotary orifices are turned relative to the stationary orifices. The shaded regions represent the effective fluid-flow area of the valve for various angular positions of the rotary orifice plate. Because the leading edges of the rotary orifices extend the full width of the stationary orifices, the fluid flow volume will quickly reach maximum after the orifices turn through a relatively small angle, assuming constant pressure. But because of the taper at the trailing edge of the rotary orifices, the volume of fluid flow drops off relatively slowly as the rotary orifice plate approaches the point at which it has rotated through an angle of 90° with respect to the stationary orifice plate.

Figure 4:
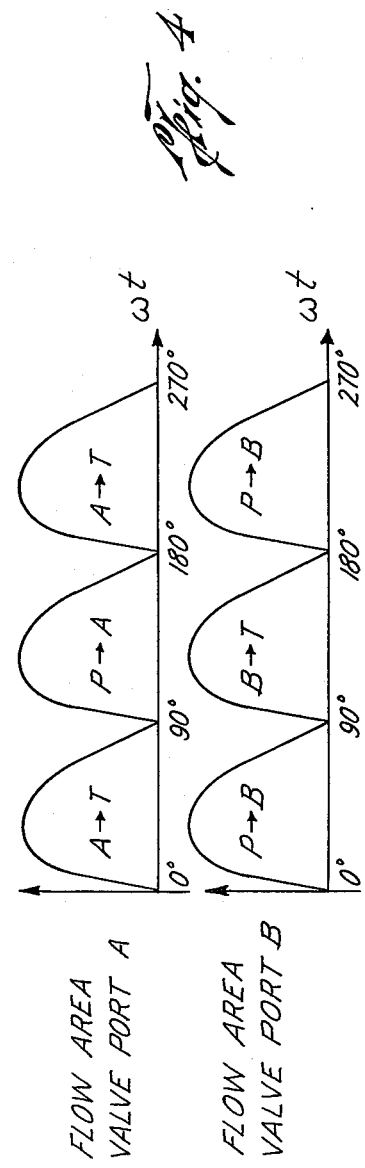
FIG. 4 is a graph of the effective orifice fluid-flow areas as a function of angular rotor position.

FIG. 4 is a graph of the effective fluid flow area and the direction of fluid flow through the rotary valve as a function of time as the rotary orifice plate is turned through 270° by way of example. Through the first 90° of rotation, fluid from peripheral ports A returns through outlet port T to drain or tank, while pressurized hydraulic fluid is abruptly fed from inlet port P to peripheral port B, thus causing linear actuator 12, FIG. 1 to execute an abrupt upward stroke. Attached baseplate 18 of course, now creates a rarefaction pulse in ground 26. As the rotary orifice plate continues to turn, the fluid flow volume is slowly reduced towards the end of the actuator stroke. Thus when a new stroke in the opposite direction is abruptly initiated, the motion of the linear actuator will have decelerated, thereby minimizing hydraulic shock.

As the rotary orifice plate continues to rotate past 90° to 180° the direction of fluid flow is reversed and linear actuator 12 is reciprocated downwards, causing base plate 18 to generate a compression pulse.

As distributor 73 continues to rotate in one direction for some desired period of time, such as 16 seconds by way of example, linear actuator 12 is repeatedly reciprocated, causing attached base plate 18 to inject a train of pulses into the ground at a frequency that is controlled by the angular velocity of distributor 73.

In FIG. 4, the rise time of the leading edge of the flow-area graph 114 is substantially shorter than the decay time of the trailing edge in proportion to a desired ratio. In one embodiment, the desired ratio is 1:2. Other ratios may be employed, depending upon the physical characteristics of a particular system; I do not limit myself to any particular ratio.

The effective fluid flow area regulates the fluid flow volume, assuming constant pressure, and hence the force that is applied to linear actuator 12. The force applied to linear actuator 12 is transmitted directly to base plate 18. The shape and amplitude of the individual pulses of a pulse train injected into ground 26 by base plate 18 are dependent, among other parameters, upon the forces applied to the base plate by the linear actuator. Therefore, the design of the rotary orifices of distributor 73 may be used to shape desired characteristics of the seismic pulses generated by base plate 18.

The rotary orifices have been described as having a fixed outline. As a result, the shape of the seismic-pulses wave form is also fixed for all sweeps, assuming constant ground conditions. In an alternate embodiment of the rotary valve the orifices could be formed in removable inserts mounted on the orifice plate. To change the waveform of the seismic pulses in response to changing ground conditions one set of orifice inserts could be exchanged for another set having differently shaped orifices.

In a linear-motion spool valve, the inertial forces of the spool are detrimental to the operation of the power-stage servo valve as discussed earlier. In the case of a rotary valve, inertial forces can act to advantage. Each time the valve orifices close, Bernoulli forces are created, imposing a variable-torque load on the driving motor. In addition to known techniques of internal pressure balancing, the addition of a suitable fly wheel to the rotary distributor will filter out the intermittent Bernoulli forces. Alternatively, the mass of the rotary distributor itself can be augmented.

A typical sweep signal has a finite length up to 16 seconds or so and may vary in frequency from perhaps, 10 Hz to some upper frequency limit such as 160 Hz. In normal field operations there is usually an idle time interval between sweeps that is measured in minutes as the vibrator is moved from station to station.

I contemplate that during the interval between sweeps, the rotary distributor will idle at a constant rotational velocity equivalent to the lowest sweep frequency. At the same time, fluid flow to the linear actuator is turned off. To execute a sweep signal on station, fluid flow to the linear actuator is turned on at a desired instant and the rotary distributor is slowly accelerated towards the upper frequency limit. At the end of the sweep period, the fluid flow to the linear actuator is shut off and the rotary distributor is allowed to coast back to idle speed during the succeeding idle time interval. Because the rate of frequency increase with respect to time is slow I have found that the inertial forces due to acceleration of the distributor during a sweep are insignificant.

The advantages of my invention are manifold. Because distributor 73 rotates continuously in one direction during the time period of a chirp signal, there are no inertial effects to impair the power output at higher frequencies. The linear actuator is decelerated towards the end of each reciprocal stroke so that hydraulic shock is minimized or eliminated. The shape and amplitudes of seismic pulses can be tailored by virtue of the design of the rotary orifices in the distributor. A simple system is provided because an intermediate pilot valve is no longer needed to control the final power stage valve.

Although my invention has been described with some degree of particularity, many changes may be made in the details of construction and the arrangement of components. My invention is not limited to the specified embodiments set forth herein by way of exemplifying the invention. It is limited only by the scope of the attached claims including the full range of equivalency to which each element or step is entitled.

I claim as my invention:

1. For use with a seismic vibrator assembly including a linear actuator having a shaft coupled to a ground-contacting base plate, a drive piston mounted on said shaft, the drive piston being slidably enclosed in a hydraulic cylinder so that when hydraulic fluid under pressure is introduced into the hydraulic cylinder alternately on opposite sides of the drive piston, the linear actuator and the base plate are reciprocated relative to a reaction mass to generate impulses in the ground, a rotary power servo valve, comprising:

a valve body having first and second peripheral fluid flow ports, fluidly communicating with the hydraulic cylinder on opposite sides of the drive piston;

a distributor, defining a fluid inlet port and a fluid outlet port, rotatably mounted within said valve body for applying pressurized hydraulic fluid from said inlet port to the hydraulic cylinder, first to one side and then to the other side of the drive piston in alternate drive cycles thereby reciprocating said actuator and said base plate, and for receiving hydraulic fluid from the hydraulic cylinder on the unpressurized side of the drive piston through said outlet port during each alternate drive cycle;

means for turning said distributor continuously in one direction at a desired angular velocity for a desired period of time to inject a train of pulses into the ground, at a desired frequency;

means for varying the angular velocity of said distributor between preselected limits over said desired time period to vary the frequency of said train of pulses;

means for varying, during each drive cycle, the rate of fluid flow through said inlet port to said hydraulic cylinder in accordance with a preselected function of the angular position of said distributor so that the individual pulses of the pulse train have a desired amplitude characteristic as a function of time;

a stator of generally cylindrical form mounted interiorly of said valve body, said stator including a stationary orifice plate defining at least two diametrically opposite stationary orifices having desired geometric boundaries, the stationary orifices being in fluid communication with said first and second peripheral ports respectively;

a shaft for supporting and rotating said distributor, a pair of noncommunicating fluid passageways disposed longitudinally within said shaft and extending inwardly from each end thereof to form an inlet and an outlet port at the respective shaft ends; and a rotary orifice plate included in said distributor that abuts said stationary orifice plate, mounted on said shaft interiorly of said stator, said rotary orifice plate defining at least two diametrically opposite rotary orifices each one of which is in fluid communication with each one of said fluid passageways, the rotary orifices having geometric boundaries that are different from the geometric boundaries of the stationary orifices, each one of said rotary orifices being alignable alternately with first one and then the other of said stationary orifices upon rotation of said distributor in one direction.

2. The rotary servo valve as defined by claim 1, wherein:

the geometric boundaries of the stationary orifices take the form of an annular sector having full-width radial lateral boundaries, the inner and outer boundaries being concentric circular arcs; and the geometric boundaries of the rotary orifices include at least one full-width radial lateral boundary at the leading edge of the orifice, the trailing boundaries being arcs of curves having different foci.

3. A rotary hydraulic power control servo valve comprising:

a valve body having pressurized-fluid inlet port and outlet ports and two peripheral ports a stator mounted interiorly of said valve body, said stator including a stationary orifice plate, defining at least two diametrically opposite stationary orifices having desired geometric boundaries including full width radial lateral boundaries, the inner and outer boundaries being concentric circular arcs;

a rotary orifice plate that abuts said stationary orifice plate, said rotary orifice plate defining at least two diametrically opposite rotary orifices, the orifices having desired geometric boundaries including at least one full width radial lateral boundary at the leading edge of the orifice, the trailing boundaries being arcs of curves having different foci;

a shaft for supporting and rotating said rotary orifice plate relative to said stationary orifice plate, first and second non-communicating fluid passageways extending inwardly from each end of said shaft that fluidly communicate respectively with said inlet and outlet ports;

means for providing fluid communication between each said stationary orifice and a corresponding one of said periphral orifices;

means for providing fluid communication between each said rotary orifices and a corresponding one of said noncommunicating passageways; and means for rotating said rotary orifice plate in one direction relative to said stator.

* * * * *